United States Patent
Lieb et al.

(10) Patent No.: US 8,705,133 B2
(45) Date of Patent: Apr. 22, 2014

(54) HIGH DYNAMIC RANGE DISPLAY SYSTEMS

(71) Applicant: Texas Instruments Incorporated, Dallas, TX (US)

(72) Inventors: David F. Lieb, San Francisco, CA (US); Andrew I. Russell, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/035,389

(22) Filed: Sep. 24, 2013

(65) Prior Publication Data

US 2014/0022274 A1    Jan. 23, 2014

Related U.S. Application Data

(63) Continuation of application No. 11/617,872, filed on Dec. 29, 2006, now Pat. No. 8,542,408.

(51) Int. Cl.
*G06K 15/00* (2006.01)
*H04N 1/405* (2006.01)

(52) U.S. Cl.
USPC ........ 358/3.13; 358/3.14; 358/3.16; 345/596; 345/589; 348/744; 359/443; 359/453

(58) Field of Classification Search
None
See application file for complete search history.

(56) References Cited

U.S. PATENT DOCUMENTS 6,891,672 B2 * 5/2005 Whitehead et al. ........... 359/443

* cited by examiner

*Primary Examiner* — Quang N Vo
(74) *Attorney, Agent, or Firm* — Warren L. Franz; Wade J. Brady, III; Frederick J. Telecky, Jr.

(57) ABSTRACT

A display system and method of producing images with high dynamic range are provided. The display system employs multiple light valves for projecting a portion of the image onto another.

10 Claims, 6 Drawing Sheets

HIGH DYNAMIC RANGE DISPLAY SYSTEMS

This is a continuation of application Ser. No. 11/617,872, filed Dec. 29, 2006 (now U.S. Pat. No. 8,542,408), the entirety of which is hereby incorporated by reference.

BACKGROUND

The technical field of the examples to be disclosed in the following sections relates to the art of display systems, and more particularly, to the field of display systems employing light valves.

Dynamic range is the ratio of intensity of the highest luminance parts of a scene and the lowest luminance parts of the scene. Over the past decade, display industries have steadily improved the dynamic range of display systems, such as display systems employing liquid-crystal cells, liquid-crystal-on silicon, plasma cells, and micromirror based light valves. Today many display systems using light valves have achieved a dynamic range of around 2000:1. However, this achieved dynamic range is still far below human visual capabilities or the dynamic range of natural scenes, which is typically around 50,000:1 or even higher. Creation of a realistic rendering of such a scene or matching human visual capacities expects a display system having a dynamic range in excess of 2000:1.

SUMMARY

In one example, a projection system is disclosed herein. The system comprises: an illumination system providing light; an imaging light valve having an array of individually addressable pixels for modulating the light so as to produce a desired image; an illumination light valve having an array of individually addressable pixels disposed between the illumination system and imaging light valve on a propagation path of the light so as to image the pixels of the illumination light valve onto the pixels of the imaging light valve; and wherein the pixel images of the illumination light valve are offset from the pixels of the imaging light valve such that the produced image has a resolution that is higher than resolution of the illumination light valve and/or the resolution of the imaging light valve.

In another example, a projection system is disclosed herein. The system comprises: an illumination system providing light; an imaging light valve having a first number of individually addressable pixels for modulating the light so as to produce a desired image; an illumination light valve having a second number of individually addressable pixels disposed between the illumination system and imaging light valve on a propagation path of the light so as to image the pixels of the illumination light valve onto the pixels of the imaging light valve; and wherein the first number is different from the second number.

In yet another example, a method of producing an image is disclosed herein. The method comprises: producing an array of light beams whose intensity are dynamically adjustable onto an imaging light valve, each light beam being capable of generating an illumination area on a pixel of an array of pixels of the imaging light valve; modulating, by the imaging light valve, the array of light beams so as to produce the image; and wherein the illumination areas are offset a distance along a diagonal of the pixel of the imaging light valve.

In yet another example, a method of producing an image is disclosed herein. The method comprises: producing an array of light beams whose intensity are dynamically adjustable onto an imaging light valve, each light beam being capable of generating an illumination area on a pixel of an array of pixels of the imaging light valve; modulating, by the imaging light valve, the array of light beams so as to produce the image; and wherein the total number of separate light beams over time is different from the total number of pixels of the imaging light valve.

In yet another example, a method of producing an image is disclosed herein. The method comprises: producing a light beam; directing the light beam onto an illumination light valve having an array of individually addressable pixels; producing an array of light beams by modulating the individually addressable pixels; modulating the array of light beams based on a set of image data, further comprising: deriving the set of image data using a pulse-width-modulation technique whose least-significant-bit is defined based on a dynamic response of a pixel from the illumination light valve and another dynamic response of a pixel from the imaging light valve; and projecting the modulated light beams from the imaging light valve onto a display target for viewing.

BRIEF DESCRIPTION OF DRAWINGS

FIG. 7b shows a top view of the reflective surface of the imaging light valve of FIG. 7a;

DETAILED DESCRIPTION OF EXAMPLES

Figure 1:
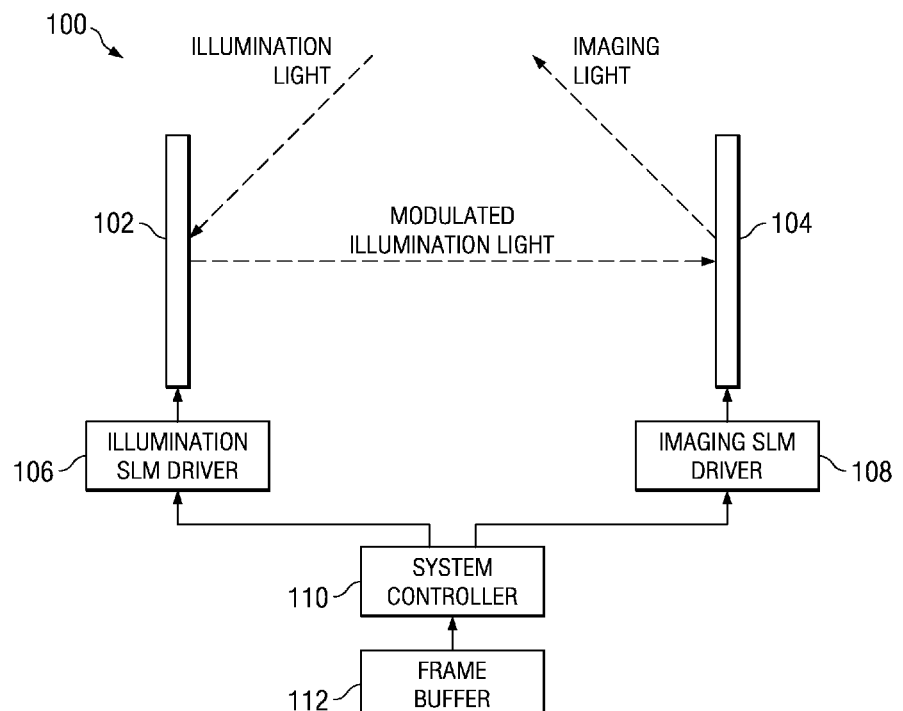
FIG. 1 illustrates a diagram of an exemplary display system.

Disclosed herein comprises a display system that employs multiple light valves for reproducing desired images, as shown in FIG. 1. Referring to FIG. 1, display system 100 comprises illumination light valve 102 and imaging light valve 104. Illumination light valve 102 is controlled and driven by illumination light valve driver 106; and imaging light valve is controlled and driven by imaging driver 108. System controller 110 is connected to the illumination and imaging light valve drivers for controlling the operations of the drivers. Also provided is frame buffer 112, in which image data, control data, can be stored.

Each light valve comprises an array of individually addressable pixels, such as reflective and deflectable micromirrors, liquid-crystal cells, liquid-crystal-on-silicon cells, emissive plasma cells, or other type of devices. The illumination and imaging light valves may have the same or different natural resolutions. For example, each of the illumination and imaging light valves may have a natural resolution of 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher. Of course, other resolutions are also applicable. When the imaging and illumination light valve s have different natural resolutions, the illumination light valve may have a resolution lower or higher than that of the imaging light valve. Moreover, the pitch size (that is defined as the distance between two adjacent pixels) and/or the pixel size of the pixels of the light valves may or may not be the same.

The illumination and imaging light valves are cascaded on the optical axis of the display system such that one light valve is imaged onto the other light valve, as shown in the figure. Specifically, the illumination and imaging light valves can be disposed in many locations on the optical axis of the display system. For example, the illuminating light valve can be disposed between the light source and the imaging light valve. The imaging light valve can be disposed before the projection lens used for projecting light onto the display screen, or between the projection lens and the display screen, or at the display screen. Alternatively, the imaging light valve can be disposed between the light source and the projection lens of the display system; while the illuminating light valve can be disposed after the light source and the imaging light valve, such as between the imaging light valve and the projection lens, between the projection lens and the screen, and at the screen. In the later example, the light from the light source is directed to the imaging light valve that is then imaged onto the illumination light valve. The modulated light from the illumination light is then projected onto the screen for viewing.

The light valves can be aligned to each other in many ways. For example, the illumination and imaging light valves can be aligned such that one light valve is imaged onto the other—that is, one light valve is at a focal plane of the other light valve. The light valves can also be aligned such that one light valve is off the focal plane of the other light valve. In either scenario, pixels of different light valves can also be aligned in many ways. For example, the image of each pixel in one light valve can be aligned accurately with a pixel of the other light valve; or can be offset a pre-determined distance along a pre-determined direction from a pixel in the other light valve. When the light valves have different resolutions, each pixel of one light valve with a lower resolution can be aligned to a sub-array of pixels in the other light valve that has a higher resolution, which will be discussed afterwards with reference to FIG. 3 through FIG. 7b.

Even with a crude alignment wherein no pixel-to-pixel alignment between the illumination and imaging light valves exists, the display system can have a dynamic range of 2000:1 or higher and a bit depth of 10 bits or higher, or 16 bits or higher. This arises from the fact that the dynamic range of the display system is $D_1 \times D_2$, wherein $D_2$:1 is the contrast ratio of the display system without the illumination light valve, and $D_1$:1 is the contrast ratio of the illumination light valve. In a typical example wherein $D_1$ and $D_2$ are around 1000:1, the resulting display system can have a dynamic range of $10^6$:1, which exceeds human visual capability for natural scenes. Moreover, a large number of grayscale levels can be provided between the dark-black and bright-white levels. For example, 10 bits or more and 16 bits or more grayscale levels can be enabled. The larger number of grayscales in turn unfetters the display system from dithering in presenting grayscale levels.

As a way of example, one of the two light valves can be designated for providing grayscale levels of desired images on a screen; and the other light valve is designated for presenting sharp image features of the desired images on the screen. Specifically, the illumination light valve can be designated for producing a low frequency portion of the desired image (e.g. a blurred image). The imaging light valve in this example can be operated with a set of image compensation data that is derived by scaling the input image data with the image data for the illumination light valve with optical blur. The scaled image data for the imaging light valve can be the input image data divided by the image data for the illumination light valve with optical blur. For example, if the illumination light valve comprises pixels that are binary devices, thus are incapable of producing instantaneous gray shades, true grayscale levels can be obtained by forming the image on the illumination light valve using a binary dither pattern and defocusing the illumination light valve (thus the image formed on the imaging light valve from the illumination light valve) so as to create a blurred image on the imaging light valve. When blurred, the binary dither pattern on the illumination light valve forms a true grayscale light intensity distribution across the imaging light valve. Alternatively, the image on the illumination light valve can also be preprocessed with typical image processing techniques, including, but not limited to, image dilation and low-pass filtering. The imaging light valve in this example can be operated with a set of compensation data that is derived by scaling the input image by the image displayed by the illumination light valve on the imaging light valve, accounting for any defocus or other optical effects.

In another example wherein the illumination light valve is capable of producing instantaneous gray shades (such as an analogue LCD panel), it may not be necessary to use a binary dither pattern on the illumination light valve. It may not be necessary to defocus the image of the illumination light valve on the imaging light valve either. However, defocusing the illumination light valve to the imaging light valve can loosen the alignment tolerances. In addition to the above discussed advantages of high dynamic range and large bit depth, other advantages are also achievable. For example, high perceived resolution of reproduced images is also achievable by accurate alignment of the illuminating and imaging pixel arrays, which will be detailed afterwards.

Figure 2:
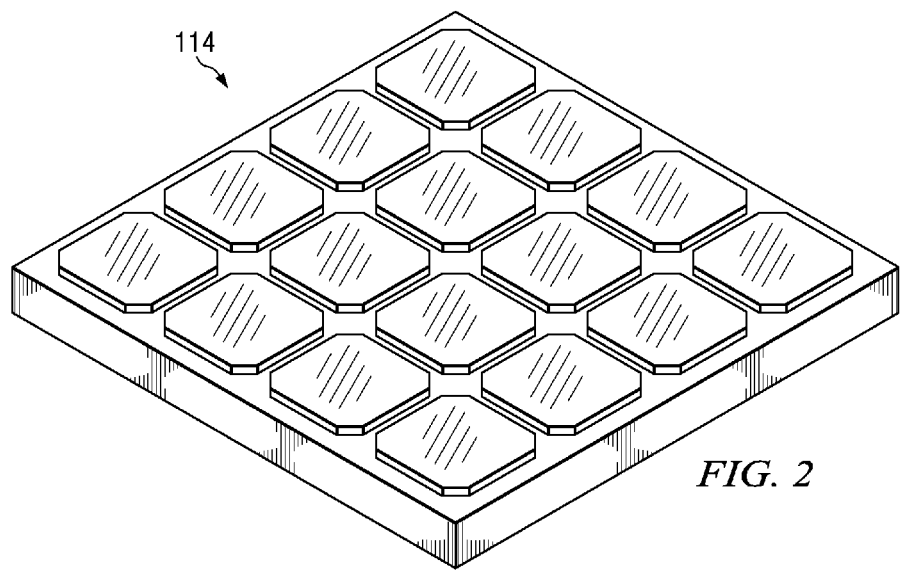
FIG. 2 schematically illustrates an exemplary active surface of either one of the light valves of the display system in FIG. 1.

The pixels of each of the illumination and imaging light valves can be of a variety of natures, such as LCD cells, LCOS cells, emissive plasma cells, and micromirrors. As one example, FIG. 2 illustrates a perspective view of an array of micromirrors that can be used for the light valves. Referring to FIG. 2, for simplicity purpose, only 16 reflective and deflectable micromirrors are illustrated in micromirror array 114. In practice, the total number of micromirrors of the array depends upon the desired natural resolution of the light valve. The micromirrors each comprises a reflective mirror plate that is capable of being moved in response to an electrostatic field established between the mirror plate and an addressing electrode associated with the mirror plate. The mirror plate is formed on a substrate that can be a semiconductor substrate or a light transmissive substrate. The mirror plate can also be derived from a single crystal, which will not be detailed herein.

Figure 3:
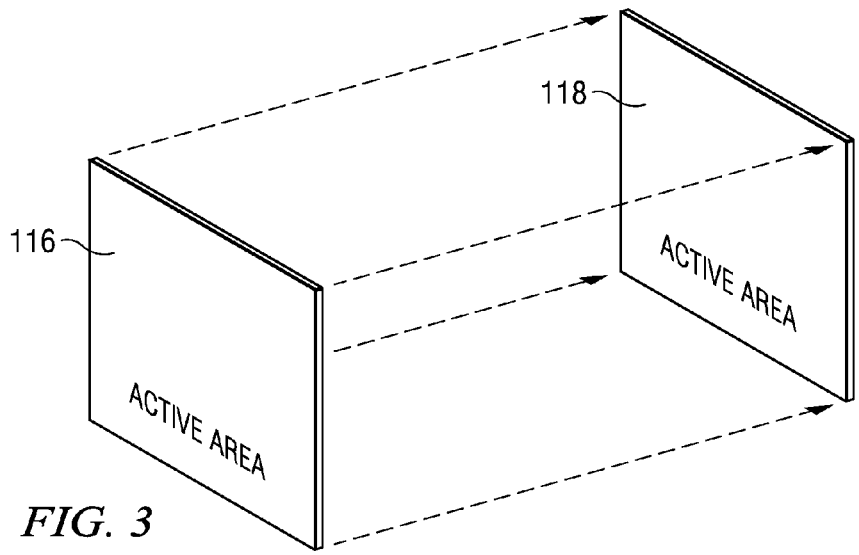
FIG. 3 schematically illustrates an exemplary arrangement of the two light valves of the display system in FIG. 1.

As discussed above with reference to FIG. 1, the illumination and imaging light valves can be aligned in many ways, one of which is schematically illustrated in FIG. 3. As shown in FIG. 3, the illumination and imaging light valves are aligned along the propagation path of the illumination light such that active area 116 of the illumination light valve (102 in FIG. 1) is substantially aligned to active area 118 of the imaging light valve (104 in FIG. 1). In this example, pixel images of the illumination light valve may or may not be aligned to individual pixels of the imaging light valve. However, by turning on and off the individual pixels of the illumination light valve, the light from the light source and incident onto the illumination light valve before impinging the imaging light valve can still be modulated and partitioned so as to achieve a system dynamic range of $D_1 \times D_2$. Moreover, a large number of grayscale levels can be provided between the dark-black and bright-white levels. For example, 10 bits or more and 16 bits or more grayscale levels can be enabled.

Figure 4:
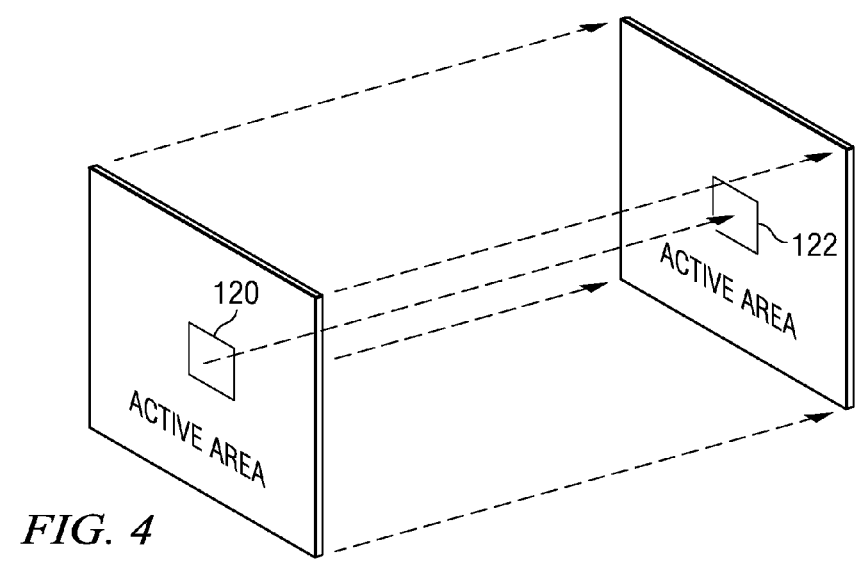
FIG. 4 schematically illustrates another exemplary arrangement of the two light valves of the display system in FIG. 1.

As an aspect of the example, the illumination and imaging light valves can be accurately aligned such that each pixel (such as pixel 120) of the illumination light valve is imaged onto and substantially perfectly aligned to a pixel (e.g. pixel 122) of the imaging light valve, as shown in FIG. 4. It is noted that, the illumination and imaging light valves in this instance may or may not have the same resolution. Specifically, when the illumination and imaging light valves have different natural resolutions, each pixel of the light valve with a lower resolution is imaged onto and substantially aligned to one of the pixels of the light valve with a higher resolution.

As another aspect of the example, 122 in FIG. 4 can be a subgroup of pixels of the imaging light valve—that is each pixel (e.g. pixel 120) of the illumination light valve can be imaged onto and aligned with a subgroup of pixels of the imaging light valve. For example, pixel subgroup may have 2 or more and 4 or more pixels. The pixels in the subgroup may be pixels consecutively positioned along a row or a column of the pixel array in the imaging light valve, or alternatively, may be pixels in an m×n pixel block, such as 2×2 pixel block, 2×3 pixel block, and 3×3 pixel block.

Figure 5:
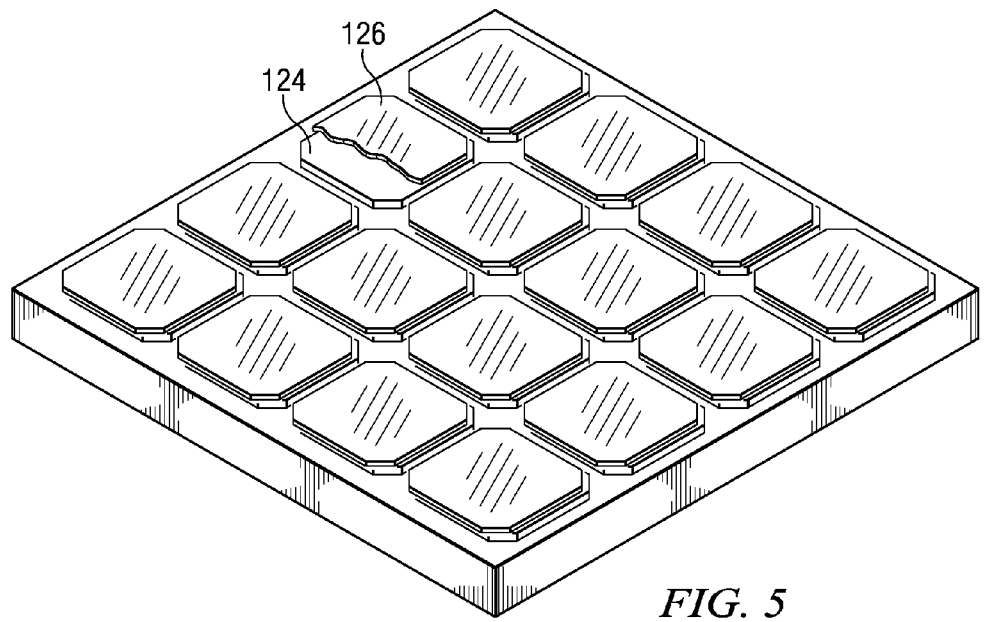
FIG. 5 illustrates a perspective view of the reflective surface of the imaging light valve and the image of the illumination light valve aligned with the imaging light valve given the arrangement shown in FIG. 4.

FIG. 5 illustrates the alignment of the illumination and imaging light valve wherein the pixels of the light valves are aligned on a one-by-one base. Referring to FIG. 5, 126 represents pixel images of the illumination light valve; and 124 represents pixels of the imaging light valve. The pixel images of 126 are substantially aligned to the pixels of the imaging light valve. In this configuration, each pixel image of 126 is a dynamically adjustable light source for the corresponding pixel of the imaging light valve. By dynamically adjusting the illumination intensity of the pixel images 126, the incident light (pixel images of 126) onto the pixels of the imaging light valve introduces additional dynamic range for the display system.

As yet another aspect of the example, the illumination and imaging light valves can be aligned such that each pixel image of the illumination light valve is shifted a distance relative to the pixels of the imaging light valve—resulting in a higher resolution in addition to a higher dynamic range. For example, the pixels images can be shifted half the diagonal distance of the pixel of the imaging light valve along the diagonal of the pixels of the imaging light valve, as shown in FIG. 6.

Figure 6:
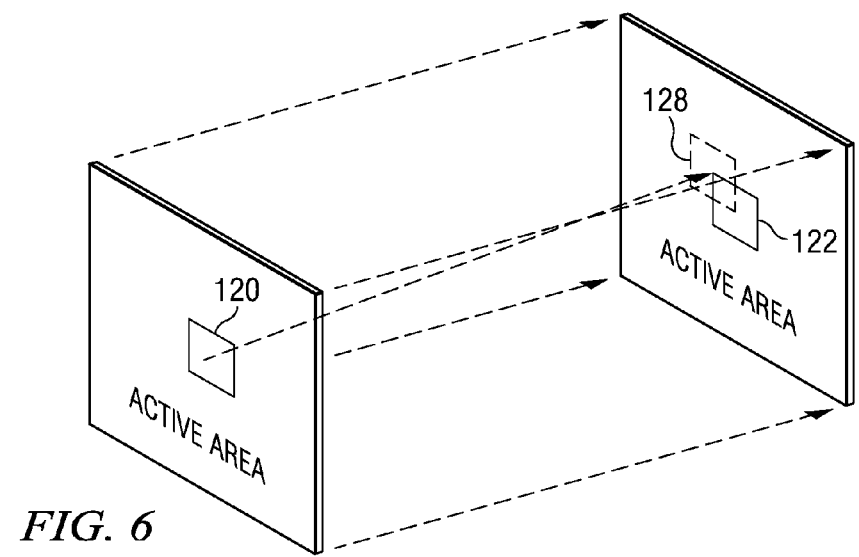
FIG. 6 schematically illustrates yet an exemplary arrangement of the two light valves of the display system in FIG. 1.
Figure 7A:
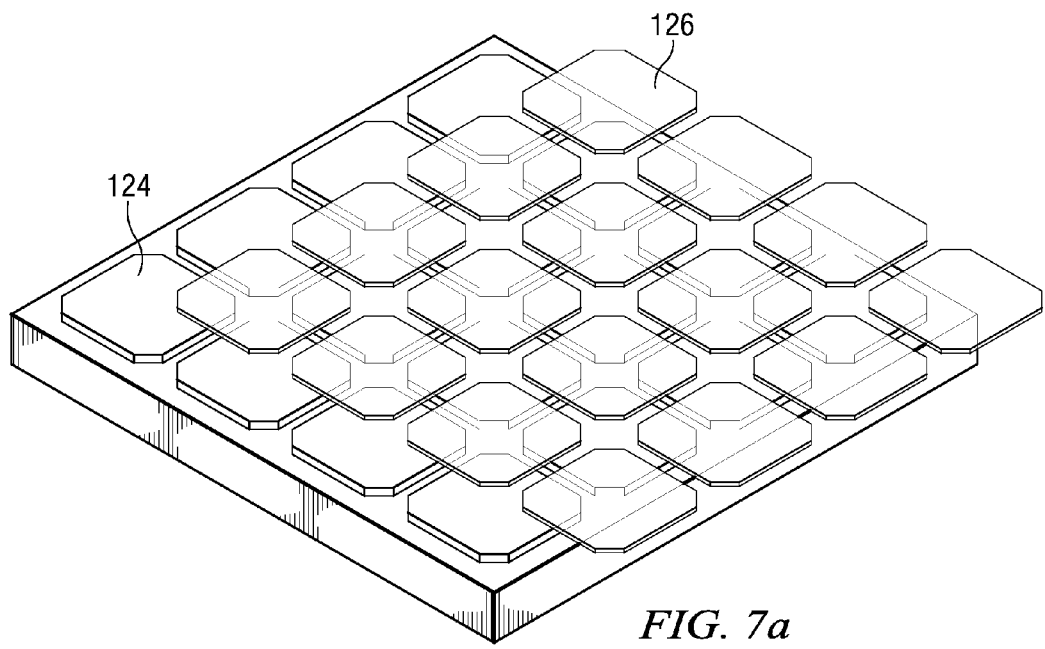
FIG. 7a illustrates a perspective view of the reflective surface of the imaging light valve and the image of the illumination light valve aligned with the imaging light valve given the arrangement shown in FIG. 6.
Figure 7B:
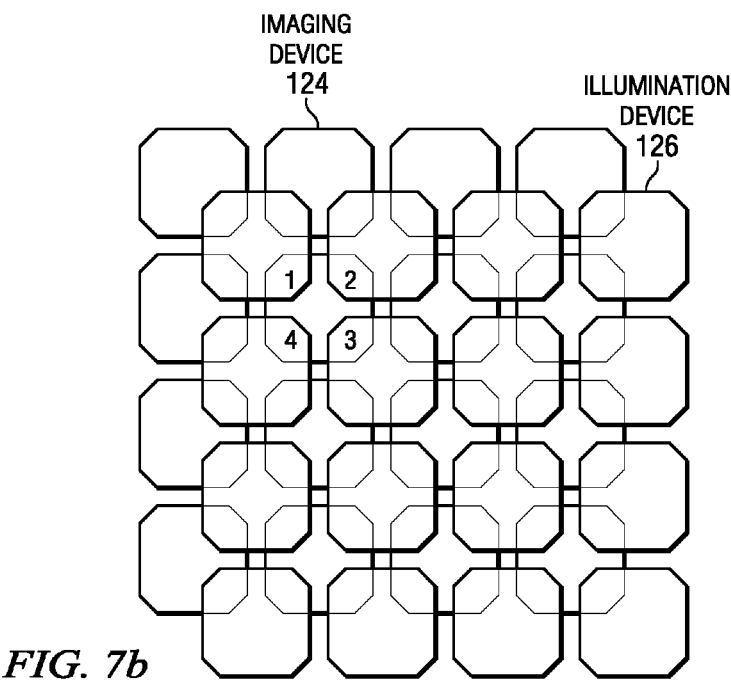

Referring to FIG. 6, for example, image 128 of pixel 120 of the illumination light valve is shifted a half the diagonal distance of pixel 122 along the diagonal of pixel 122 of the imaging light valve. FIG. 7a illustrates a perspective view such alignment, wherein 126 denotes the image of the pixels of the illumination light valve; and 124 denotes the pixels of the imaging light valve. Such alignment can be better seen in the top view of the imaging light valve as shown in FIG. 7b. Referring to FIG. 7b, because of the position offset, the image of each pixel of the illumination light valve covers substantially portions of four adjacent pixels of the imaging light valve. In another word, each pixel of the imaging light valve is optically partitioned into four areas (e.g. areas 1, 2, 3, and 4 as shown in the figure) each of which is illuminated by separate images of four adjacent pixels of the illumination light valve. This configuration yields a display system having at least two imaging light valves. The resolution of such display system can be (2N−1)×(2N−1), wherein each of the light valves has N×N natural resolutions. When N is much larger than 1, which is common for most of current light valves used in display systems, the resolution of the display system can be simplified as 4N×N, which is 4 times the resolution of each individual light valves. At the same time, the display system achieves a dynamic range of substantially $D_1 \times D_2$ and a bit depth of 10 bits or more or 16 bits or more. It is noted that the illumination and imaging light valves may or may not have the same natural resolution. However, it is preferred, though not required, that the pixels of the illumination and imaging light valves are substantially rectangular or square, and each have substantially the same shape and reflective area.

As another example, pixels of the illumination and imaging light valves may have different reflective areas. For example, in FIG. 7b, each dashed open square of 126 may represent an image of a single pixel (e.g. micromirror) of the illumination light valve, whereas each solid open square of 124 represents a block of pixels (e.g. 2×2 pixel block, 2×3 pixel block, and 3×3 pixel block) of the imaging light valve.

In the example when pixels of the illumination light valve are accurately aligned to the pixels of the light valve even though pixel images of the illumination light valve may be offset a distance from the corresponding pixels of the imaging light valve, the pixels of the both illumination and imaging light valves together determine the illumination intensity of the pixels of the produced image (e.g. the image on the display target). This implies that either light valve can turn off an image pixel of the produced image. Such fact enables definition of extremely small least-significant-bit (LSB), such as a LSB less than 7 microseconds, less than 5 microseconds, and less than 600 nanoseconds. Specifically, a LSB can be defined by a rising edge of a pixel from one of the illumination and imaging light valves (e.g. the time for turning on the pixel), and a falling edge (e.g. the time for turning off a pixel) of a pixel of the other one of the illumination and imaging light valves, as shown in FIG. 8.

Figure 8:
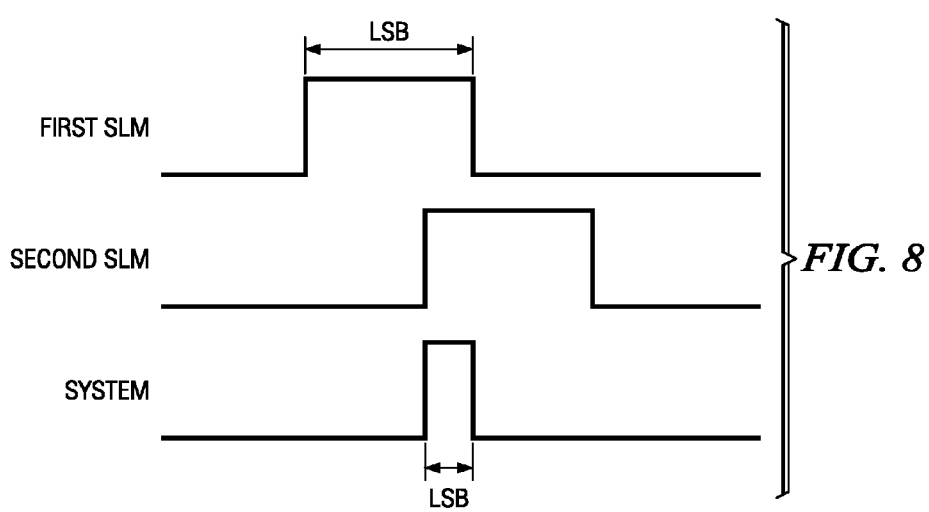
FIG. 8 illustrates an exemplary least-significant-bit achievable by the display system.

Referring to FIG. 8, the system LSB can be defined such that the rising edge of the LSB corresponds to the rising edge of the second light valve that can be either one of the illumination and imaging light valve, but more preferably the fastest rising edge of the illumination and imaging light valves. The falling edge of the system LSB can be defined as the falling edge of the first light valve (the other one of the illumination and imaging light valves). Such way of LSB definition provides significant flexibility of light valve design and fabrication but is still capable of providing small LSB. This way of LSB definition is of particular importance for light valves wherein pixels have asymmetric ON and OFF response time. In practice, such as in the instance when the pixels are micromirrors, the micromirrors may exhibit different ON and OFF time responses, which result in different rising and falling edges of the LSB. This often occurs especially when each micromirror has one single addressing electrode, and the mirror plate of the micromirror turns on in response to an electrostatic field, whereas turns off in response to mechanic deformation stored in a deformable hinge. For systems using light valves whose pixels exhibit asymmetric ON and OFF responses, the LSB can be defined by the faster rising edge and falling edge of the pixels of the imaging and illumination light valves. In fact, when the falling edge of the pixels of the first light valve and the rising edge of the pixels of the second light valve are combined to define the system LSB, the first light valve can be designated to sacrifice the stringent requirement for the rising edge (turning ON response) so as to improve other pixel properties or to meet other pixel requirement. Similar to the second light valve, designing the second light valve may sacrifice the falling edge (turning OFF response) when needed.

Figure 9:
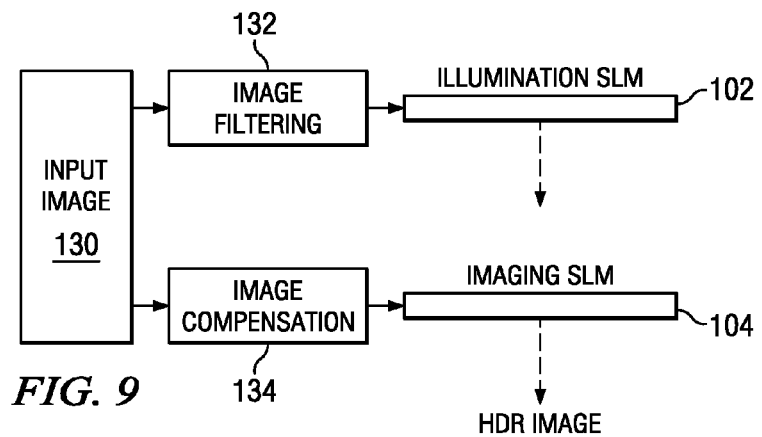
FIG. 9 is a diagram showing an exemplary method of producing high dynamic range images.

Referring to FIG. 9, luminance channel of input image 130 is delivered to imaging filtering module 132. The imaging filtering module may comprise a low-pass filter for filtering out the high-frequency portion of the input image based on a pre-determined low-pass threshold. The imaging filtering may have other functional modules for performing other desired functions, such as binary and/or temporal dithering and/or image dilation. The filtered image after the imaging filtering is delivered to illumination light valve 102 for imaging. The image produced by the illumination light valve is then projected to imaging light valve 104.

All other luminance channels, such as the color luminance channels (e.g. Red, Green, Blue, and White, or Cyan, Magenta, Yellow, and White) are delivered to image compensation module 134 for processing. In one example, the image compensation module derived a set of image data by scaling the input image data with the image data output from the image filtering module and delivered to the illumination light valve, accounting any optical effects, such as optical blur.

The processed image data output from the image compensation module is then delivered to imaging light valve 104. The imaging light valve produces an image based on the processed image data from the image compensation module. Because the image produced by the illumination light valve is projected on the imaging light valve during the production of the image by the imaging light valve, the final image after the imaging light valve is a combination of the images produced by both illumination and imaging light valves.

The above system configuration has many advantages. For example, in addition to the high dynamic range and small LSB as afore discussed, true gray shades of produced images can be achieved because of the optical blur of the image by the illumination light valve. A light meter measuring a large smooth region of the produced image can see a substantial uniformity over time. This significantly reduces potential artifact introduced by using Pulse-width-modulation techniques for generating grayscales.

Figure 10:
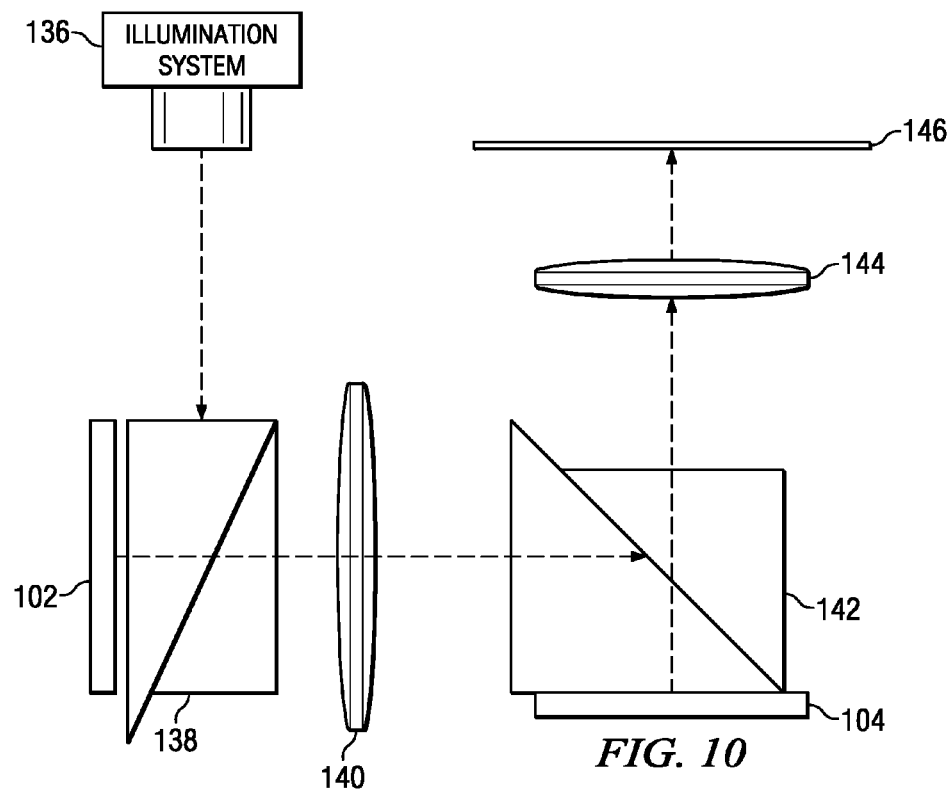
FIG. 10 is a diagram showing an exemplary display system.

Referring to FIG. 10, the display system comprises illumination system 136 that produces illumination light. The illumination system may comprise a light source and other elements, such as a color wheel and light integrator. The light source can be any suitable light sources, such as arc lamps, LEDs, and lasers. When LED or lasers are used, an array of LEDs (or lasers) of the same or different output light spectrums can be provided.

Light from illumination system 136 is directed to illumination light valve 102 through TIR prism 138. The image produced by illumination light valve 102 is projected onto imaging light valve 104 through relay lens 140 and TIR prism 142. Imaging light valve 104 modulates the incident light and produces an image that is projected onto display target 146 through projection lens 144 for viewing.

Figure 11:
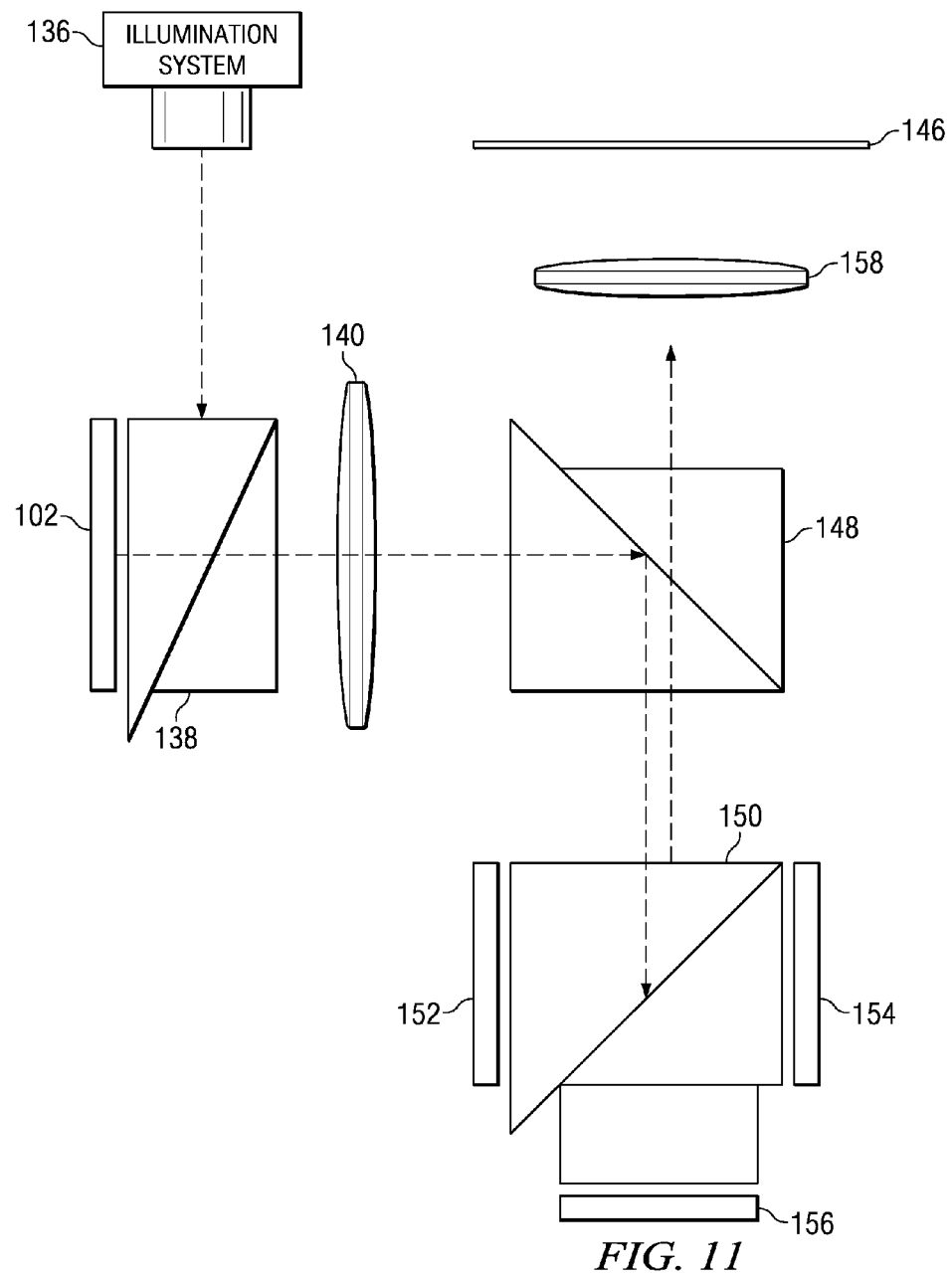
FIG. 11 is a diagram showing another exemplary display system.

Other than a display system having one single imaging light valve, such as imaging light valve 104 in FIG. 10, a display system can have multiple imaging light valves, such as that shown in FIG. 11. Referring to FIG. 11, three imaging light valves 152, 154, and 156 are employed for modulating different spectrum portions, such as red, green, and blue (or cyan, yellow, and magenta) of the incident light that is modulated by illumination light valve 102 and directed through relay lens 140 and TIR 148 and dichroic prism 150. The individually modulated image portions from light valves 152, 154, and 156 are then combined together at the display target 146 after projection lens 158.

It is noted that even though imaging light valves 102, 152, 154, and 156 are disposed before projection lens 158 along the propagation path of the light, this is one of many possible configurations. In an alternative configuration, imaging light valves 152, 154, and 156 can be between the projection lens and the screen, or at the screen. In another alternative configuration, illumination light valve 102 can be disposed between the projection lens and the screen, or at the screen.

In the example as shown in FIG. 11, imaging light valve 102 is disposed before imaging light valves 152, 154, and 156 along the propagation path of the illumination light from the light source (136). In an alternative example, imaging light valve 102 can be disposed after imaging light valves 152, 154, and 156 along the propagation path of the illumination light from the light source (136), which is not shown in the figure.

In the display system examples as shown in FIG. 10 and FIG. 11, illumination light valve 102 is separate from the illumination system 136. In another example, the illumination light valve, as well as the dichroic prism and/or relay lens, can be integrated into and thus an integral portion of the illumination system.

In the above exemplary display systems, imaging and illumination light valves are disposed before projection lenses (e.g. projection lens 144 in FIG. 10 and projection lens 158 in FIG. 11). In other alternative examples, the imaging or illumination light valve can be disposed after the projection lens. For example, the imaging or illumination light valve can be disposed between the projection lens and the screen to overcome the ANSI contrast limitation of the projection lens. In another example, the imaging or illumination light valve can be disposed at the screen.

It will be appreciated by those of skill in the art that a new and useful display system and an imaging method of high dynamic range have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

What is claimed is:

1. A display system for producing an image from image data for an image to be displayed, comprising:
   an illumination light valve comprising a first array of individually addressable pixel elements;
   an imaging light valve comprising a second array of individually addressable pixel elements; and
   projection optics;
   wherein the illumination light valve is dimensioned and configured to modulate an incident beam of light by the first pixel element array using the image data and to direct the modulated beam from the first pixel element array to form a blurred defocused image on the imaging light valve;

wherein the imaging light valve is dimensioned and configured to modulate light of the blurred image by the second pixel element array using the image data;

wherein the projection optics is dimensioned and configured to project the modulated light of the blurred defocused image from the second pixel element array onto a display surface; and wherein pixel elements of the illumination light valve are dimensioned and configured to provide illumination light for modulation by the imaging light valve having intensity variations, with highest and lowest intensities of the illumination light directed in general spatial correspondence onto pixel elements of the imaging light valve that image highest and lowest luminance parts of a scene of the image to be displayed.

2. The system of claim 1, wherein the illumination light valve is further dimensioned and configured to modulate the beam of light by the first pixel array using a dither pattern.

3. The system of claim 1, wherein the illumination light valve is further dimensioned and configured to modulate the beam of light using the image data with an image process that comprises a low frequency pass filtering.

4. The system of claim 1, wherein the illumination light valve is further dimensioned and configured to modulate the beam of light using the image data with an image process that comprises an image dilation process.

5. The system of claim 1, wherein the pixel elements of the lights valve are further dimensioned and configured to operate at an ON and OFF state.

6. The system of claim 5, wherein the pixel elements are micromirror devices, or liquid crystal cells.

7. The system of claim 1, wherein the pixel elements are analog devices.

8. The system of claim 1, wherein the locations of pixel elements of the first pixel element array are optically spatially shifted by a distance from locations of corresponding pixel elements of the second pixel element array.

9. The system of claim 8, wherein the locations of pixel elements of the first pixel element array are shifted by a distance equal to half a diagonal distance of pixel elements of the second pixel element array.

10. A display system for producing an image from image data for an image to be displayed, comprising:

a first digital micromirror device comprising a first array of individually addressable pixel micromirror elements;

a second digital micromirror device comprising a second array of individually addressable pixel micromirror elements; and projection optics;

wherein the first digital micromirror device is dimensioned and configured to modulate an incident beam of light by the first array using the image data and a dither pattern to form an image grayscale light intensity distribution across the second array;

wherein the second digital micromirror device is dimensioned and configured to modulate light of the image grayscale distribution by the second array using the image data;

wherein the projection optics is dimensioned and configured for project the modulated light of the image grayscale light intensity distribution from the second array onto a display surface; and wherein pixel elements of the first digital micromirror device are dimensioned and configured to provide illumination light for modulation by the imaging light valve having intensity variations, with highest and lowest intensities of the illumination light directed in general spatial correspondence onto pixel elements of the second digital micromirror device that image highest and lowest luminance parts of a scene of the image to be displayed.

* * * * *